United States Patent
Igarashi et al.

(10) Patent No.: US 7,371,271 B2
(45) Date of Patent: May 13, 2008

(54) COMPOSITE SOFT MAGNETIC SINTERED MATERIAL HAVING HIGH DENSITY AND HIGH MAGNETIC PERMEABILITY AND METHOD FOR PREPARATION THEREOF

(75) Inventors: Kazunori Igarashi, Saitama (JP); Ryoji Nakayama, Saitama (JP); Koichiro Morimoto, Niigata (JP); Muneaki Watanabe, Saitama (JP)

(73) Assignee: Mitsubishi Materials PMG Corporation, Niigata-shi (JP)

( * ) Notice: Subject to any disclaimer, the term of this patent is extended or adjusted under 35 U.S.C. 154(b) by 626 days.

(21) Appl. No.: 10/472,499

(22) PCT Filed: Mar. 29, 2002

(86) PCT No.: PCT/JP02/03201

§ 371 (c)(1),
(2), (4) Date: Apr. 6, 2004

(87) PCT Pub. No.: WO02/081129

PCT Pub. Date: Oct. 17, 2002

(65) Prior Publication Data

US 2004/0161600 A1    Aug. 19, 2004

(30) Foreign Application Priority Data

Apr. 2, 2001    (JP)    ............................. 2001-103457
Jul. 23, 2001    (JP)    ............................. 2001-221064

(51) Int. Cl.
*B22F 3/00*    (2006.01)
*H01F 1/01*    (2006.01)

(52) U.S. Cl. .................. 75/246; 75/232; 148/105; 148/306; 148/307; 419/19; 419/35; 419/38; 419/48; 419/49

(58) Field of Classification Search .................. 75/232; 148/100, 105, 306, 307; 252/62.55, 62.56
See application file for complete search history.

(56) References Cited

U.S. PATENT DOCUMENTS

| | | | | |
|---|---|---|---|---|
| 3,775,328 A | * | 11/1973 | Denes | ...................... 252/62.55 |
| 4,104,549 A | | 8/1978 | Akimoto et al. | |
| 5,183,631 A | * | 2/1993 | Kugimiya et al. | ............ 419/10 |
| 5,188,898 A | * | 2/1993 | Tagawa et al. | ............. 428/403 |
| 5,348,800 A | * | 9/1994 | Moro et al. | .................. 428/328 |
| 5,866,028 A | * | 2/1999 | Toyota | ..................... 252/62.63 |
| 6,726,740 B1 | * | 4/2004 | Draxler et al. | ................. 75/246 |

FOREIGN PATENT DOCUMENTS

| | | | |
|---|---|---|---|
| JP | 48-91598 | | 11/1973 |
| JP | 56-38402 | | 4/1981 |
| JP | 61-255511 | | 11/1986 |
| JP | 61-256967 | | 11/1986 |
| JP | 3-248404 | | 11/1991 |
| WO | 01/45116 | * | 6/2001 |

* cited by examiner

*Primary Examiner*—Roy King
*Assistant Examiner*—Ngoclan T. Mai
(74) *Attorney, Agent, or Firm*—Oblon, Spivak, McClelland, Maier & Neustadt, P.C.

(57) ABSTRACT

An object of the present invention is to provide a composite soft magnetic sintered material that has high density, high mechanical strength and high relative magnetic permeability at high frequencies and, in order to achieve this object, the present invention provides a method of producing the composite soft magnetic sintered material, which comprises mixing a composite soft magnetic powder, that consists of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder (hereinafter these powders are referred to as soft magnetic metal powder) of which particles are coated with a ferrite layer which has a spinel structure, with 0.05 to 1.0% by weight of silicon dioxide powder having a mean powder particle size of 100 nm or less and sintering the mixed powder after compression molding, or processing two or more kinds of the composite soft magnetic powders, of which particles are coated with ferrite layer having a spinel structure of a different compositions, by compression molding and sintering.

15 Claims, 2 Drawing Sheets

COMPOSITE SOFT MAGNETIC SINTERED MATERIAL HAVING HIGH DENSITY AND HIGH MAGNETIC PERMEABILITY AND METHOD FOR PREPARATION THEREOF

TECHNICAL FIELD

The present invention relates to a composite soft magnetic sintered material having high density and high magnetic permeability, and a method of producing the same.

BACKGROUND ART

Soft magnetic sintered materials are used in magnetic cores for such devices as low-loss yoke, transformer and choke coil used in motors, actuators or the like. And it is known that the soft magnetic sintered materials can be obtained by sintering a soft magnetic metal powder such as:

iron powder such as pure iron powder;

Fe—Si based soft magnetic iron alloy powder containing 0.1 to 10% by weight of Si with the rest consisting of Fe and inevitable impurities (for example, iron alloy powder of Fe-3% Si);

Fe—Si—Al based soft magnetic iron alloy powder containing 0.1 to 10% by weight of Si and 0.1 to 20% by weight of Al with the rest consisting of Fe and inevitable impurities (for example, Sendust iron alloy powder having a composition of Fe-9% Si-5% Al);

Fe—Al based soft magnetic iron alloy powder containing 0.1 to 20% by weight of Al with the rest consisting of Fe and inevitable impurities (for example, Alperm iron alloy powder having a composition of Fe-15% Al);

Fe—Cr based soft magnetic iron alloy powder containing 1 to 20% by weight of Cr and, as required, one or two of 5% or less Al and 5% or less Si with the rest consisting of Fe and inevitable impurities; or nickel-based soft magnetic alloy powder containing 35 to 85% of Ni and, as required, one or more of 5% or less Mo, 5% or less Cu, 2% or less Cr and 0.5% or less Mn with the rest consisting of Fe and inevitable impurities (for example, powder of Fe-79% Ni) (hereinabove percentages are by weight). It is also known that soft magnetic sintered materials can be obtained by sintering a powder of a metal oxide such as ferrite that has a spinel structure. The ferrite having a spinel structure is generally represented by formula $(MeFe)_3O_4$ (where Me represents Mn, Zn, Ni, Mg, Cu, Fe or Co, or a mixture of some of these elements).

However, although the soft magnetic sintered metals have high saturation magnetic flux densities, they are inferior in high frequency characteristics. The soft magnetic sintered metal oxides that are made by sintering powder of a metal oxide such as ferrite having a spinel structure, on the other hand, have good high frequency characteristics and relatively high initial magnetic permeability, but have low saturation magnetic flux densities. In order to overcome these drawbacks, a composite soft magnetic sintered material has been proposed that is obtained by sintering a composite soft magnetic powder formed from a soft magnetic metal powder of which particles are coated with layers of ferrite having a spinel structure on the surface thereof (refer to Unexamined Japanese Patent Application, First Publication No. Sho 56-38402).

However, in the composite soft magnetic sintered material that is obtained by sintering the composite soft magnetic powder formed from the soft magnetic metal powder of which particles are coated with layers of ferrite having a spinel structure on the surface thereof, the ferrite layer having a spinel structure is made of an oxide and it is therefore difficult to sinter, thus resulting in a problem that the composite soft magnetic sintered material that has a sufficient density cannot be obtained. Thus there is a demand for a composite soft magnetic sintered material having further improved magnetic characteristics.

DISCLOSURE OF THE INVENTION

The present inventors have intensively studied the problem described above and found the following:

(A) A mixed powder having improved sintering characteristics can be obtained by preparing a composite soft magnetic powder by forming a ferrite layer which has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, and mixing the composite soft magnetic powder with 0.05 to 1.0% by weight of silicon dioxide powder having a mean powder particle size of 100 nm or less. A composite soft magnetic sintered material, that is made from the mixed powder containing the silicon dioxide powder by compression molding, high-pressure molding, warm compaction or cold isostatic pressing followed by sintering, or by hot isostatic pressing or hot pressing, has higher density and hence higher mechanical strength, and has higher magnetic characteristics and, particularly, improved relative magnetic permeability at high frequencies;

(B) A mixed powder, that is obtained by mixing two or wore kinds of composite soft magnetic powders made by forming ferrite layer which has a spinel structure of a different composition on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, and sintering the mixed powder after compression molding, high-pressure molding, warm compaction or cold isostatic pressing, or processing the mixed powder by hot isostatic pressing or hot pressing, is easier to sinter than in such a case as the composite soft magnetic powder coated with ferrite layer of the same type is processed by compression molding, high-pressure molding, warm compaction or cold isostatic pressing followed by sintering, or by hot isostatic pressing or hot pressing. As a result, the composite soft magnetic sintered material thus obtained has higher density and hence higher mechanical strength, while the magnetic characteristics are improved and, in particular, relative magnetic permeability at high frequencies is improved;

(C) A mixed powder, that is obtained by mixing two or more kinds of composite soft magnetic powders made by forming ferrite layer of a spinel structure that has a different composition on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, with the mixture being further mixed with 0.05 to 1.0% by weight of silicon dioxide powder having a mean powder particle size of 100 nm or less, has further improved sintering characteristics. A composite soft magnetic sintered material, that is made from the mixed powder containing silicon dioxide powder by compression molding, high-pressure molding, warm compaction or cold isostatic pressing followed by sintering, or by hot isostatic pressing or hot pressing, has higher density and hence higher mechanical strength, while the magnetic characteristics are improved further and, in particular, the relative magnetic permeability at high frequencies is improved further, (D) In the composite soft magnetic sintered material obtained by the method (A) described above, the iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles that are coated with a ferrite phase having a spinel structure on the surface thereof are dispersed and the silicon dioxide powder having a mean powder particle size of 100 nm or less that is added thereto does not form a solid solution with the ferrite phase even when sintered and therefore remains dispersed in the ferrite phase. As a result, the composite soft magnetic sintered material has such a structure as the silicon dioxide particles having a mean powder particle size of 100 nm or less are dispersed in the ferrite phase, and the proportion of the silicon dioxide particles dispersed in the ferrite phase is from 0.05 to 1.0% by weight, the same as that of the silicon dioxide powder that was added;

(E) The composite soft magnetic sintered material obtained by the method (B) described above has such a structure as the iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles that are coated with a ferrite phase which has a spinel structure and has a different composition formed on the surface thereof are dispersed;

(F) The composite soft magnetic sintered material obtained by the method (C) described above comprises the iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles that are coated with a ferrite phase which has a spinel structure and has a different composition formed on the surface thereof being dispersed therein, wherein the silicon dioxide powder, having a mean powder particle size of 100 nm or less, that has been added thereto does not form a solid solution with the a ferrite phase even when sintered and therefore remains dispersed in the ferrite phase of a different composition, and the composite soft magnetic sintered material has such a structure as the silicon dioxide particles having a wean powder particle size of 100 nm or less are dispersed in the ferrite phase that has a different composition, and the proportion of the silicon dioxide particles dispersed in the ferrite phase of a different composition is from 0.05 to 1.0% by weight, the same as that of the silicon dioxide powder that was added; and (G) The ferrite layer having a spinel structure formed on the particles of the iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder can be formed by a chemical plating process, high-speed impact agitation coating process where the coating layer is formed mechanically by high speed agitation, or binder coating process where the coating layer is formed by bonding with resin.

The present invention has been completed on the basis of the findings obtained from the research described above, and is characterized by the following features:

(1) A composite soft magnetic sintered material having high density and high magnetic permeability with such a structure as iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles, coated with a ferrite phase that has a spinel structure are dispersed, and silicon dioxide particles having a mean powder particle size of 100 nm or less are dispersed in said ferrite phase, wherein the content of silicon dioxide is from 0.05 to 1.0% by weight;

(2) A composite soft magnetic sintered material having high density and high magnetic permeability with such a structure as iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles, coated with a ferrite phase that has a spinel structure of a different composition are dispersed;

(3) A composite soft magnetic sintered material having high density and high magnetic permeability with such a structure as iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles, coated with a ferrite that has a spinel structure of a different composition are dispersed, and silicon dioxide particles having a mean powder particle size of 100 nm or less are dispersed among said ferrite phase, wherein the content of silicon dioxide is from 0.05 to 1.0% by weight;

(4) A method of producing the composite soft magnetic sintered material having high density and high magnetic permeability described in (1), wherein the composite soft magnetic powder, that is made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, is mixed with 0.05 to 1.0% by weight of silicon dioxide powder having a mean powder particle size in a range from 1 to 100 nm, and the mixed powder is sintered after compression molding, high-pressure molding, warm compaction or cold isostatic pressing;

(5) A method of producing the composite soft magnetic sintered material having high density and high magnetic permeability described in (1), wherein the composite soft magnetic powder, that is made by forming ferrite layer which has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy-powder, is mixed with 0.05 to 1.0% by weight of silicon dioxide powder having a mean powder particle size in a rage from 1 to 100 nm, and the mixed powder is subjected to hot isostatic pressing or hot pressing;

(6) A method of producing the composite soft magnetic sintered material having high density and high magnetic permeability described in (2), which comprises preparing two or more kinds of composite soft magnetic powders that are made by forming ferrite layer which has a spinel structure of a different composition on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, mixing and sintering two or more kinds of composite soft magnetic powders after compression molding, high-pressure molding, warm compaction or cold isostatic pressing;

(7) A method of producing the composite soft magnetic sintered material having high density and high magnetic permeability described in (2), which comprises preparing two or more kinds of composite soft magnetic powders, that are made by forming ferrite layer having a spinel structure of a different composition on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, mixing two or more kinds of the composite soft magnetic powders, and subjecting them to hot isostatic pressing or hot pressing;

(8) A method of producing the composite soft magnetic sintered material having high density and high magnetic permeability described in (3), which comprises preparing two or more kinds of composite soft magnetic powders, that are made by forming ferrite layer having a spinel structure of a different composition on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, mixing two or more kinds of the composite soft magnetic powders with 0.05 to 1.0% by weight of silicon dioxide powder having a mean powder particle size in a range from 1 to 100 nm, sintering the mixed powder after compression molding, high-pressure molding, warm compaction or cold isostatic pressing;

(9) A method of producing the composite soft magnetic sintered material having high density and high magnetic permeability described in (3), which comprises preparing two or more kinds of composite soft magnetic powders, that are made by forming a ferrite layer having a spinel structure of a different composition on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, mixing two or more kinds of the composite soft magnetic powders with 0.05 to 1.0% by weight of silicon dioxide powder having a mean powder particle size in a range from 1 to 100 nm, and subjecting the mixed powder to hot isostatic pressing or hot pressing; and

(10) A method of producing the composite soft magnetic sintered material having high density and high magnetic permeability described in any one of (4), (5), (6), (7), (8) and (9), wherein the composite soft magnetic powder, that is made by forming ferrite layer having a spinel structure on the surface of the particles of the iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, is made by forming the ferrite layer on the particles of the iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder by a chemical plating process, a high-speed impact agitation coating process or a binder coating process.

BEST MODE FOR CARRYING OUT THE INVENTION

Figure 1:
FIG. 1 is a photograph of a secondary electron image taken by an Auger spectrometer showing grain boundaries in sintered material No. 61 of the present invention.

The iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder used in the method of producing the composite soft magnetic sintered material of the present invention having high density and high magnetic permeability is a soft magnetic alloy powder that has been known to the public, for which the soft magnetic metal powder such as iron powder, Fe—Si based soft magnetic iron alloy powder containing 0.1 to 10% by weight of Si with the rest consisting of Fe and inevitable impurities, Fe—Si—Al based soft magnetic iron alloy powder containing 0.1 to 10% by weight of Si and 0.1 to 20% by weight of Al with the rest consisting of Fe and inevitable impurities, Fe—Al based soft magnetic iron alloy powder containing 0.1 to 20% by weight of Al with the rest consisting of Fe and inevitable impurities, Fe—Cr based soft magnetic iron alloy powder containing 1 to 20% by weight of Cr and, as required, one or two of 5% or less Al and 5% or less Si with the rest consisting of Fe and inevitable impurities; or nickel-based soft magnetic alloy powder containing 35 to 85% of Ni and, as required, one or more of 5% or less Mo, 5% or less Cu, 2% or less Cr and 0.5% or less Mn with the rest consisting of Fe and inevitable impurities, that has been described in conjunction with the prior art may be used.

Therefore, the iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles or nickel-based soft magnetic alloy particles included in the composite soft magnetic sintered material of the present invention having high density and high magnetic permeability are made of the soft magnetic metal particles of the same composition as that of the soft magnetic metal powder described above, and the ferrite phase having a spinel structure that covers the soft magnetic metal particles and separates the particles is a ferrite phase represented by the general formula $(MeFe)_3O_4$ (where Me represents Mn, Zn, Ni, Mg, Cu, Fe or Co, or a mixture of some of these elements).

The iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, of which particles are coated with layers of ferrite having a spinel structure on the surface thereof, that are used as the feed stock powder in producing the composite soft magnetic sintered material of the present invention having high density and high magnetic permeability can be made by forming the ferrite layer by a chemical plating process, high-speed impact agitation coating process or binder coating process.

The composite soft magnetic sintered material of the present invention having high density and high magnetic permeability can be produced by any of the methods (4) to (9) described above using the composite soft magnetic powder made as described above.

The compression molding process and the high-pressure molding process employed in the methods of (4), (6) and (8) described above are different only in the molding pressure. The high-pressure molding process molds powder with a pressure higher than in the ordinary compression molding process, and has the merit that the compressed body made by the high-pressure molding process can be sintered at a somewhat lower temperature.

The term "sintering" used in the method of producing the composite soft magnetic sintered material of the present invention having high density and high magnetic permeability includes liquid phase sintering as well as solid phase sintering. Therefore, sintering carried out in the methods of (4), (6) and (8) described above includes liquid phase sintering as well as solid phase sintering.

The reason for limiting the mean powder particle size of the silicon dioxide powder included in the composite soft magnetic sintered material of the present invention having high density and high magnetic permeability to 100 nm or less is that the effect of improving the sintering characteristic decreases and the relative magnetic permeability decreases when the mean powder particle size of the silicon dioxide powder is larger than 100 nm. The lower limit of the mean powder particle size of the silicon dioxide powder is preferably 1 nm or larger for reasons of the production cost.

The reason for setting the content of the silicon dioxide powder of a mean powder particle size within 100 nm to 0.05% by weight or more is that the sintering characteristics are not significantly affected and relative magnetic permeability decreases when less than 0.05% by weight of the silicon dioxide powder of a mean powder particle size within 100 nm is included, while the content exceeding 1.0% by weight has undesirable effects such as increasing the proportion of nonmagnetic phase and decreasing the relative magnetic permeability. The content of the silicon dioxide powder is most preferably in a range from 0.1 to 0.5% by weight.

EXAMPLE 1

An alloy material was melted by induction melting, with the resultant molten metal being subjected to water atomization so as to make an atomized powder, and the atomized powder was classified to prepare atomized feed stock powder. The atomized feed stock powder was classified further with an air classifier thereby to make a soft magnetic powder such as pure iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder and nickel-based soft magnetic alloy powder that had compositions and a mean powder particle sizes shown in Tables 1 and 2 (hereinafter these soft magnetic powders are referred to as soft magnetic metal powder). These soft magnetic metal powders were immersed in ion exchange water, stirred well and were fully deoxidized with nitrogen.

Aqueous solutions of metal chlorides having the oxide composition shown in Tables 1 and 2 were prepared by dissolving metal chlorides ($MCl_2$, where M represents Fe, Ni, Zn, Cu, Mn or Mg) in ion exchange water that had been fully deoxidized with nitrogen. The aqueous solutions of metal chlorides were gently poured onto the soft magnetic metal powders, and the pH value was adjusted to 7.0 by means of an aqueous solution of NaOH. This mixed liquid was held at a constant temperature of 70° C., and was stirred mildly while blowing air therein for a period of 0.3 to 3 hours, thereby to form a ferrite coating layer on the surfaces of the particles of the soft magnetic metal powder. Then the soft magnetic metal powder coated with ferrite layer was filtered, washed in water and dried thereby to obtain the composite soft magnetic powder.

$SiO_2$ powder having the mean powder particle size shown in Tables 1 and 2 was mixed in the composite soft magnetic powder obtained as described above, with the mixture being pressed with a pressure of 6 tons/cm$^2$ to mold ring-shaped green compacts measuring 35 mm in outer diameter, 25 mm in inner diameter and 5 mm in height. The ring-shaped green compact was sintered in an inert gas atmosphere with a controlled partial pressure of oxygen at temperature from 600 to 1200° C., thereby making composite soft magnetic sintered materials of the present invention 1 to 16, comparative composite soft magnetic sintered materials 1 to 3 and composite soft magnetic sintered material of the prior art, all having a ring shape. SEM observation of the structures of ring-shaped sintered bodies showed $SiO_2$ powder dispersed in the ferrite phase in all the composite soft magnetic sintered materials of the present invention 1 to 16 and the comparative composite soft magnetic sintered materials 1 to 3. The relative density was measured on the composite soft magnetic sintered materials of the present invention 1 to 16, the comparative composite soft magnetic sintered materials 1 to 3 and the composite soft magnetic sintered material of the prior art, with the results shown in Tables 3 and 4. The relative magnetic permeability at high frequencies was measured at frequencies shown in Tables 3 and 4 with an impedance analyzer on the composite soft magnetic sintered materials of the present invention 1 to 16, the comparative composite soft magnetic sintered materials 1 to 3 and the composite soft magnetic sintered material of the prior art, with the results shown in Tables 3 and 4.

TABLE 1

| | | Composite soft magnetic powder | | | | | |
|---|---|---|---|---|---|---|---|
| | | Soft magnetic metal powder | | Ferrite coating layer | | $SiO_2$ powder | |
| Composite soft magnetic sintered materials | | Composition (% by weight) | Mean powder particle size (μm) | Composition (atomic %) | Mean thickness (μm) | Mean powder particle size (nm) | Content (% by weight) |
| Composite soft magnetic sintered materials of present invention | 1 | Fe: 100 | 52 | $(Mn_{33}Fe_{67})_3O_4$ | 0.2 | 10 | 0.6 |
| | 2 | Fe: 100 | 78 | $(Mn_{17}Zn_{16}Fe_{67})_3O_4$ | 1.4 | 30 | 0.8 |
| | 3 | Fe: 100 | 88 | $(Ni_{10}Zn_{19}Fe_{71})_3O_4$ | 1.2 | 80 | 0.3 |
| | 4 | Fe: 99, Si: 1 | 69 | $(Cu_5Mg_5Zn_{23}Fe_{67})_3O_4$ | 2.4 | 30 | 0.2 |
| | 5 | Fe: 97, Si: 3 | 90 | $(Mn_{16}Mg_5Zn_{14}Fe_{71})_3O_4$ | 0.8 | 80 | 0.9 |
| | 6 | Fe: 90, Al: 10 | 76 | $(Mn_{10}Cu_5Zn_{18}Fe_{67})_3O_4$ | 1.7 | 30 | 0.15 |
| | 7 | Fe: 85, Si: 10, Al: 5 | 85 | $(Mn_{25}Fe_{75})_3O_4$ | 2.0 | 80 | 0.7 |
| | 8 | Fe: 51, Ni: 49 | 49 | $(Mn_{17}Zn_{12}Fe_{71})_3O_4$ | 0.4 | 10 | 0.07 |
| | 9 | Fe: 21, Ni: 79 | 55 | $(Mn_{10}Cu_5Zn_{14}Fe_{71})_3O_4$ | 1.9 | 10 | 0.4 |
| | 10 | Fe: 16, Ni: 79, Mo: 5 | 63 | $(Ni_{10}Zn_{23}Fe_{67})_3O_4$ | 0.5 | 30 | 0.5 |
| | 11 | Fe: 95, Cr: 5 | 48 | $(Ni_{10}Zn_{15}Fe_{75})_3O_4$ | 2.3 | 30 | 0.2 |

TABLE 2

| Composite soft magnetic sintered materials | | Composite soft magnetic powder | | | | SiO₂ powder | |
|---|---|---|---|---|---|---|---|
| | | Soft magnetic metal powder | | Ferrite coating layer | | | |
| | | Composition (% by weight) | Mean powder particle size (μm) | Composition (atomic %) | Mean thickness (μm) | Mean powder particle size (nm) | Content (% by weight) |
| Composite soft magnetic sintered materials of present invention | 12 | Fe: 91, Cr: 9 | 76 | $(Ni_{10}Cu_5Zn_{15}Fe_{70})_3O_4$ | 1.7 | 80 | 0.5 |
| | 13 | Fe: 87, Cr: 13 | 61 | $(Mn_{25}Fe_{75})_3O_4$ | 2.2 | 80 | 0.3 |
| | 14 | Fe: 83, Cr17 | 78 | $(Ni_5Zn_{20}Fe_{75})_3O_4$ | 1.4 | 10 | 0.5 |
| | 15 | Fe: 93, Cr: 3, Al: 2 | 52 | $(Ni_{10}Cu_5Mn_{18}Fe_{67})_3O_4$ | 0.1 | 30 | 0.1 |
| | 16 | Fe: 90, Cr: 9, Si: 1 | 84 | $(Ni_{10}Zn_{23}Fe_{67})_3O_4$ | 0.7 | 30 | 0.8 |
| Comparative composite soft magnetic sintered materials | 1 | Fe: 100 | 78 | $(Mn_{15}Mg_5Zn_9Fe_{71})_3O_4$ | 1.5 | 120* | 0.2 |
| | 2 | Fe: 97, Si: 3 | 90 | $(Mn_{29}Fe_{71})_3O_4$ | 0.3 | 30 | 0.02* |
| | 3 | Fe: 21, Ni: 79 | 55 | $(Ni_6Zn_{23}Fe_{71})_3O_4$ | 0.9 | 30 | 1.2ª |
| Composite soft magnetic sintered material of the prior art | | Fe: 100 | 78 | $(Ni_{10}Zn_{23}Fe_{67})_3O_4$ | 1.5 | — | — |

Figures marked with * are out of the scope of the present invention.

TABLE 3

| Composite soft magnetic sintered materials | | Relative density (%) | Relative magnetic permeability at various frequencies | | | | | | |
|---|---|---|---|---|---|---|---|---|---|
| | | | 1 KHz | 3 KHz | 10 KHz | 30 KHz | 100 KHz | 300 KHz | 1 MHz |
| Composite soft magnetic sintered materials of present invention | 1 | 95 | 312 | 313 | 313 | 311 | 312 | 301 | 232 |
| | 2 | 94 | 301 | 299 | 298 | 300 | 301 | 299 | 273 |
| | 3 | 94 | 291 | 277 | 279 | 278 | 277 | 275 | 251 |
| | 4 | 95 | 279 | 277 | 279 | 278 | 277 | 275 | 251 |
| | 5 | 93 | 292 | 291 | 292 | 292 | 294 | 265 | 189 |
| | 6 | 93 | 288 | 288 | 289 | 288 | 289 | 285 | 276 |
| | 7 | 96 | 286 | 284 | 285 | 285 | 281 | 264 | 203 |
| | 8 | 93 | 304 | 304 | 305 | 304 | 301 | 286 | 207 |
| | 9 | 94 | 290 | 289 | 290 | 290 | 289 | 289 | 280 |
| | 10 | 94 | 321 | 321 | 321 | 320 | 321 | 319 | 296 |
| | 11 | 92 | 289 | 290 | 290 | 288 | 266 | 241 | 212 |

TABLE 4

| Composite soft magnetic sintered materials | | Relative density (%) | Relative magnetic permeability at various frequencies | | | | | | |
|---|---|---|---|---|---|---|---|---|---|
| | | | 1 KHz | 3 KHz | 10 KHz | 30 KHz | 100 KHz | 300 KHz | 1 MHz |
| Composite soft magnetic sintered materials of present invention | 12 | 95 | 300 | 299 | 300 | 300 | 299 | 296 | 279 |
| | 13 | 95 | 296 | 295 | 296 | 296 | 287 | 262 | 207 |
| | 14 | 94 | 290 | 290 | 291 | 290 | 276 | 254 | 204 |
| | 15 | 96 | 307 | 307 | 307 | 305 | 305 | 300 | 292 |
| | 16 | 94 | 301 | 300 | 300 | 300 | 297 | 291 | 274 |
| Comparative composite soft magnetic sintered materials | 1 | 90 | 224 | 224 | 222 | 223 | 221 | 206 | 147 |
| | 2 | 89 | 231 | 230 | 230 | 231 | 228 | 210 | 122 |
| | 3 | 88 | 206 | 206 | 207 | 206 | 207 | 205 | 172 |
| Composite soft magnetic sintered material of the prior art | | 85 | 212 | 211 | 212 | 212 | 212 | 210 | 181 |

From the results shown in Tables 1 to 4, it can be seen that the composite soft magnetic sintered materials of the present invention 1 to 16, that were made by compression molding and sintering of the mixture of composite soft magnetic powder consisting of soft magnetic metal powder coated with layers of ferrite having a spinel structure on the surface thereof and 0.05 to 1.0% by weight of SiO₂ powder, have higher density than the composite soft magnetic sintered material of the prior art and excellent relative magnetic permeability at high frequencies, although the comparative composite soft magnetic sintered materials of 1 to 3 are inferior in at least one of density and relative magnetic permeability.

EXAMPLE 2

Molten metal was subjected to water atomization so as to make atomized powder, and the atomized powder was classified to prepare atomized feed stock powder. The atomized feed stock powder was classified further with an air classifier thereby to make the soft magnetic metal powders having compositions and the mean powder particle sizes shown in Tables 5. These soft magnetic metal powders were immersed in ion exchange water, stirred well and were fully deoxidized with nitrogen.

Aqueous solutions of metal chlorides having the oxide compositions shown in Tables 5 were prepared by dissolving metal chlorides ($MCl_2$, where M represents Fe, Zn, Cu, Mn or Mg) in ion exchange water that had been fully deoxidized with nitrogen. The aqueous solutions of metal chlorides were gently poured onto the soft magnetic metal powders, with the pH value thereof being adjusted to 7.0 by means of an aqueous solution of NaOH. This mixed liquid was held at a constant temperature of 70° C., and was stirred mildly while blowing air therein for a period of 0.3 to 3 hours, thereby to form a ferrite coating layer on the surfaces of the particles of the soft magnetic metal powder. Then the soft magnetic metal powder coated with the ferrite coating layer was filtered, washed in water and dried thereby to obtain composite soft magnetic powders A to G having ferrite coating layer formed on the particles thereof shown as in Table 5.

The composite soft magnetic powders A to G obtained as described above were mixed in the proportions shown in Tables 6 and 7 and were pressed with a pressure of 6 tons/cm² to mold a ring-shaped green compacts measuring 35 mm in outer diameter, 25 mm in inner diameter and 5 mm in height. The ring-shaped green compacts were sintered in an inert gas atmosphere with controlled partial pressure of oxygen at temperature from 600 to 1200° C., thereby making composite soft magnetic sintered materials of the present invention 17 to 30 and the composite soft magnetic sintered materials of the prior art 1 to 7, all having a ring shape. The relative density was measured on the composite soft magnetic sintered materials of the present invention 17 to 30 and the composite soft magnetic sintered materials of the prior art 1 to 7, with the results shown in Tables 6 and 7. The relative magnetic permeability at high frequencies was measured with an impedance analyzer at the frequencies shown in Tables 6 and 7 on the composite soft magnetic sintered materials of the present invention 17 to 30, and the composite soft magnetic sintered material of the prior art 1 to 7, with the results shown in Tables 6 and 7.

TABLE 5

| | Type | Soft magnetic metal powder Composition (% by weight) | Mean powder particle size (μm) | Ferrite coating layer Composition (atomic %) | Mean thickness (μm) |
|---|---|---|---|---|---|
| Composite soft magnetic powders | A | Fe: 100 | 52 | $(Mn_{33}Fe_{67})_3O_4$ | 0.2 |
| | B | Fe: 100 | 78 | $(Mn_{17}Zn_{16}Fe_{67})_3O_4$ | 1.4 |
| | C | Fe: 99, Si: 1 | 69 | $(Cu_5Mg_5Zn_{23}Fe_{67})_3O_4$ | 2.4 |
| | D | Fe: 97, Si: 3 | 90 | $(Mn_{10}Mg_5Zn_{14}Fe_{71})_3O_4$ | 0.8 |
| | E | Fe: 90, Al: 10 | 76 | $(Mn_{10}Cu_5Zn_{18}Fe_{67})_3O_4$ | 1.7 |
| | F | Fe: 21, Ni: 79 | 66 | $(Mn_{10}Cu_5Zn_{15}Fe_{70})_3O_4$ | 0.5 |
| | G | Fe: 87, Cr: 13 | 61 | $(Mn_{25}Fe_{75})_3O_4$ | 2.2 |

TABLE 6

| Composite soft magnetic sintered materials | | Proportions of composite soft magnetic powders shown in Table 5 (% by weight) | | | | | | | Relative density (%) | Relative magnetic permeability at various frequencies | | | | | | |
|---|---|---|---|---|---|---|---|---|---|---|---|---|---|---|---|---|
| | | A | B | C | D | E | F | G | | 1 KHz | 3 KHz | 10 KHz | 30 KHz | 100 KHz | 300 KHz | 1 MHz |
| Composite soft magnetic sintered materials of present invention | 19 | 50 | — | 50 | — | — | — | — | 96 | 286 | 286 | 287 | 286 | 287 | 281 | 255 |
| | 20 | — | 70 | — | 30 | — | — | — | 94 | 293 | 292 | 293 | 293 | 293 | 276 | 234 |
| | 21 | — | — | 40 | 60 | — | — | — | 94 | 288 | 286 | 286 | 287 | 286 | 270 | 217 |
| | 22 | 40 | — | — | 30 | 30 | — | — | 95 | 305 | 305 | 305 | 304 | 305 | 294 | 264 |
| | 23 | — | 80 | 10 | 10 | — | — | — | 93 | 307 | 306 | 306 | 307 | 306 | 300 | 266 |
| | 24 | 20 | 20 | — | — | 60 | — | — | 94 | 278 | 278 | 279 | 279 | 278 | 272 | 259 |
| | 25 | 30 | — | 20 | 30 | 20 | — | — | 93 | 291 | 290 | 290 | 290 | 290 | 276 | 251 |
| | 26 | — | 20 | 20 | 30 | 30 | — | — | 93 | 287 | 288 | 287 | 287 | 288 | 273 | 254 |
| | 27 | 10 | 50 | 10 | 10 | 20 | — | — | 96 | 302 | 302 | 303 | 302 | 302 | 282 | 267 |
| | 28 | 20 | 10 | 20 | 30 | 10 | — | — | 95 | 294 | 295 | 294 | 295 | 295 | 291 | 269 |
| | 29 | 40 | — | — | — | 60 | — | — | 96 | 293 | 291 | 292 | 291 | 290 | 272 | 244 |
| | 30 | — | 20 | 30 | — | — | — | 50 | 94 | 290 | 290 | 291 | 290 | 287 | 271 | 237 |
| | 31 | 20 | — | — | 10 | 20 | 20 | 30 | 93 | 298 | 298 | 297 | 298 | 297 | 287 | 268 |
| | 32 | 10 | 20 | 10 | 10 | 20 | 20 | 10 | 94 | 301 | 303 | 303 | 302 | 300 | 284 | 270 |

TABLE 7

| Composite soft magnetic sintered materials | | Proportion of composite soft magnetic powders shown in Table 5 (% by weight) | | | | | | | Relative density (%) | Relative magnetic permeability at various frequencies | | | | | | |
|---|---|---|---|---|---|---|---|---|---|---|---|---|---|---|---|---|
| | | A | B | C | D | E | F | G | | 1 KHz | 3 KHz | 10 KHz | 30 KHz | 100 KHz | 300 KHz | 1 MHz |
| Composite soft | 1 | 100 | — | — | — | — | — | — | 88 | 230 | 230 | 229 | 230 | 216 | 298 | 106 |
| | 2 | — | 100 | — | — | — | — | — | 89 | 225 | 225 | 225 | 222 | 204 | 161 | 95 |

TABLE 7-continued

| Composite soft magnetic sintered materials | | Proportion of composite soft magnetic powders shown in Table 5 (% by weight) | | | | | | Relative density (%) | Relative magnetic permeability at various frequencies | | | | | | |
|---|---|---|---|---|---|---|---|---|---|---|---|---|---|---|---|
| | | A | B | C | D | E | F | G | | 1 KHz | 3 KHz | 10 KHz | 30 KHz | 100 KHz | 300 KHz | 1 MHz |
| magnetic | 3 | — | — | 100 | — | — | — | — | 89 | 212 | 211 | 211 | 211 | 212 | 204 | 143 |
| sintered | 4 | — | — | — | 100 | — | — | — | 90 | 219 | 218 | 218 | 217 | 218 | 202 | 135 |
| materials | 5 | — | — | — | — | 100 | — | — | 89 | 227 | 227 | 226 | 227 | 226 | 211 | 174 |
| of the | 6 | — | — | — | — | — | 100 | — | 87 | 222 | 223 | 223 | 222 | 218 | 203 | 181 |
| prior art | 7 | — | — | — | — | — | — | 100 | 89 | 206 | 206 | 205 | 205 | 198 | 195 | 149 |

From the results shown in Tables 5 to 7, it can be seen that the composite soft magnetic sintered materials of the present invention 17 to 30, that were made by mixing and sintering the composite soft magnetic powders consisting of the soft magnetic metal powders coated with ferrite coating layers of a different composition and having a spinel structure on the surface thereof, have higher density than the composite soft magnetic sintered material of the prior art 1 to 7 and excellent relative magnetic permeability at high frequencies.

EXAMPLE 3

The composite soft magnetic powders A to G made in Example 2 were mixed further with $SiO_2$ powder in the proportions shown in Table 8 and were pressed with pressure of 6 tons/cm² to mold a ring-shaped green compacts measuring 35 mm in outer diameter, 25 mm in inner diameter and 5 mm in height. The ring-shaped green compacts were sintered in an inert gas atmosphere with a controlled partial pressure of oxygen at a temperature from 600 to 1200° C., thereby making the composite soft magnetic sintered materials of the present invention 31 to 36. The relative density was measured on the composite soft magnetic sintered materials of the present invention 31 to 36, with the results shown in Table 8. The relative magnetic permeability at high frequencies was measured with an impedance analyzer at the frequencies shown in Table 8 on the composite soft magnetic sintered materials of the present invention 31 to 36, with the results shown in Table 8.

TABLE 8

| Composite soft magnetic sintered materials | | Proportion (% by weight) | | | | | | | $SiO_2$ powder of mean powder particle size shown in ( ) | Relative density (%) | Relative magnetic permeability at various frequencies | | | | | | |
|---|---|---|---|---|---|---|---|---|---|---|---|---|---|---|---|---|---|
| | | Composite soft magnetic powder shown in Table 5 | | | | | | | | | | | | | | | |
| | | A | B | C | C | E | F | G | | | 1 KHz | 3 KHz | 10 KHz | 30 KHz | 100 KHz | 300 KHz | 1 MHz |
| Composite soft magnetic sintered materials of present invention | 31 | — | 40 | — | — | 20 | 39.6 | — | 0.4 (30 nm) | 97 | 304 | 305 | 304 | 305 | 305 | 292 | 254 |
| | 32 | 29.1 | — | — | 20 | 20 | — | 30 | 0.9 (80 nm) | 97 | 308 | 309 | 309 | 308 | 308 | 305 | 296 |
| | 33 | 10 | 10 | 20 | — | — | 30 | 29.1 | 0.1 (10 nm) | 96 | 299 | 299 | 298 | 298 | 295 | 278 | 244 |
| | 34 | 40 | — | — | 20 | — | 39.4 | — | 0.6 (10 nm) | 96 | 302 | 302 | 300 | 301 | 300 | 292 | 277 |
| | 35 | — | 59.5 | — | — | — | 40 | — | 0.5 (30 nm) | 98 | 316 | 314 | 314 | 315 | 313 | 303 | 291 |
| | 36 | — | — | 39.3 | — | 20 | — | 40 | 0.7 (80 nm) | 96 | 302 | 302 | 303 | 302 | 302 | 300 | 286 |

It can be seen that the composite soft magnetic sintered materials of the present invention 31 to 36 shown in Table 8, that were made by mixing the composite soft magnetic powders consisting of the soft magnetic metal powder coated with the ferrite coating layer having a spinel structure and a different composition on the surfaces of the particles thereof with $SiO_2$ powder in the proportions shown in Table 8 and sintering the mixture, have higher density than the composite soft magnetic sintered material of the prior art 1 to 7 shown in Table 7 that were made in Example 2 and excellent relative magnetic permeability at high frequencies.

EXAMPLE 4

The soft magnetic metal powder shown in Table 9 and ferrite powder were mixed in proportions of soft magnetic metal powder: ferrite powder=98:2. The mixed powder was processed for two minutes in a high-speed impact mixer with an impeller rotating at a speed of 6000 rpm, thereby making the composite soft magnetic powders AS, BS, CS, DS, ES, FS and GS having a ferrite coating layer on the particles thereof shown in Table 9.

A SiO$_2$ powder having a mean powder particle size of 50 nm was mixed with the composite soft magnetic powders AB, BB, CB, DB, EB, FB and GB obtained as described above in the proportions shown in Table 14, with the mixted power being subjected to high-pressure of 2 tons/cm2 at 8000C so as to mold the composite soft magnetic sintered materials of the present invention 37 to 43 having a ring shape measuring 35 mm in outer diameter, 25 mm in inner diameter and 5 mm in height. TEM Auger electron spectrometer (AES) observation of the structures of ring-shaped sintered bodies showed 5i02 powder dispersed in the ferrite phase in all the composite soft magnetic sintered materials of the present invention 37 to 43. The relative density was measured on the composite soft magnetic sintered materials of the present invention 37 to 43, with the results shown in Table 10. The relative magnetic permeability at high frequencies was measured with an impedance analyzer at the frequencies shown in Table 10 on the composite soft magnetic sintered materials of the present invention 37 to 43, with the results shown in Table 10.

sisting of the soft magnetic metal powder of which particles are coated with a ferrite layer having a spinel structure by a high-speed impact stirring coating method and processing the mixture by a hot pressing process, have higher density than the composite soft magnetic sintered material of the prior art 1 to 7 shown in Table 7 and excellent relative magnetic permeability at high frequencies.

EXAMPLE 5

The composite soft magnetic powders AS, BS, CS, DS, ES, FS and GS shown in Table 9 made in Example 4 were mixed in the proportions shown in Table 11. The mixed powders were hot-pressed with a pressure of 2 tons/cm$^2$ at 800° C. so as to make the composite soft magnetic sintered materials of the present invention 44 to 53 having a ring shape measuring 35 mm in outer diameter, 25 mm in inner diameter and 5 mm in height. The relative density was measured on the composite soft magnetic sintered materials of the present invention 44 to 53, with the results shown in

TABLE 9

| | | Soft magnetic metal powder | | Ferrite coating layer | |
|---|---|---|---|---|---|
| Type | | Composition (% by weight) | Mean powder particle size (μm) | Composition (atomic %) | Mean thickness (μm) |
| Composite | AS | Fe: 100 | 52 | $(Mn_{33}Fe_{67})_3O_4$ | 1.7 |
| soft | BS | Fe: 100 | 78 | $(Mn_{17}Zn_{16}Fe_{67})_3O_4$ | 1.5 |
| magnetic | CS | Fe: 99, Si: 1 | 69 | $(Cu_5Mg_5Zn_{23}Fe_{67})_3O_4$ | 2.1 |
| sintered | DS | Fe: 97, Si: 3 | 90 | $(Mn_{10}Mg_5Zn_{14}Fe_{71})_3O_4$ | 1.9 |
| materials | ES | Fe: 90, Al: 10 | 76 | $(Mn_{10}Cu_5Zn_{18}Fe_{67})_3O_4$ | 2.4 |
| | FS | Fe: 21, Ni: 79 | 66 | $(Mn_{10}Cu_5Zn_{15}Fe_{70})_3O_4$ | 2.0 |
| | GS | Fe: 87, Cr: 13 | 61 | $(Mn_{25}Fe_{75})_3O_4$ | 1.2 |

TABLE 10

| | | Proportion (% by weight) | | | Relative magnetic permeability at various frequencies | | | | | | |
|---|---|---|---|---|---|---|---|---|---|---|---|
| Composite soft magnetic sintered materials | | Composite soft magnetic powder shown in Table 9 | SiO$_2$ powder having mean powder particle size of 50 nm | Relative density (%) | 1 KHz | 3 KHz | 10 KHz | 30 KHz | 100 KHz | 300 KHz | 1 MHz |
| Composite | 37 | AS: 99.6 | 0.4 | 93 | 310 | 311 | 310 | 310 | 309 | 288 | 221 |
| soft magnetic | 38 | BS: 99.1 | 0.9 | 92 | 275 | 276 | 276 | 277 | 276 | 274 | 209 |
| sintered | 39 | CS: 99.9 | 0.1 | 94 | 308 | 308 | 309 | 309 | 308 | 286 | 222 |
| materials of | 40 | DS: 99.4 | 0.6 | 93 | 298 | 299 | 298 | 297 | 297 | 280 | 215 |
| present | 41 | ES: 99.5 | 0.5 | 93 | 299 | 299 | 299 | 298 | 297 | 278 | 210 |
| invention | 42 | FS: 99.3 | 0.7 | 92 | 285 | 286 | 285 | 286 | 285 | 272 | 203 |
| | 43 | GS: 99.7 | 0.3 | 94 | 291 | 292 | 292 | 291 | 291 | 283 | 218 |

From the results shown in Tables 9 and 10, it can be seen that the composite soft magnetic sintered materials of the present invention 37 to 43, that were made by mixing 0.05 to 1.0% by weight of SiO$_2$ powder with the composite soft magnetic powders AS, BS, CS, DS, ES, FS and GS con- Table 11. The relative magnetic permeability at high frequencies was measured with an impedance analyzer at the frequencies shown in Table 11 on the composite soft magnetic sintered materials of the present invention 44 to 53, with the results shown in Table 11.

TABLE 11

| Composite soft magnetic sintered materials | | Proportion of composite soft magnetic powder shown in Table 9 (% by weight) | | | | | | | Relative density (%) | Relative magnetic permeability at various frequencies | | | | | | |
|---|---|---|---|---|---|---|---|---|---|---|---|---|---|---|---|---|
| | | AS | BS | CS | DS | ES | FS | GS | | 1 KHz | 3 KHz | 10 KHz | 30 KHz | 100 KHz | 300 KHz | 1 MHz |
| Composite soft | 44 | 50 | — | 50 | — | — | — | — | 95 | 295 | 296 | 295 | 295 | 295 | 282 | 253 |
| magnetic sintered | 45 | — | 70 | — | — | 30 | — | — | 96 | 299 | 301 | 300 | 300 | 300 | 290 | 260 |

TABLE 11-continued

| Composite soft magnetic sintered materials | | Proportion of composite soft magnetic powder shown in Table 9 (% by weight) | | | | | | | Relative density (%) | Relative magnetic permeability at various frequencies | | | | | | |
|---|---|---|---|---|---|---|---|---|---|---|---|---|---|---|---|---|
| | | AS | BS | CS | DS | ES | FS | GS | | 1 KHz | 3 KHz | 10 KHz | 30 KHz | 100 KHz | 300 KHz | 1 MHz |
| materials of present invention | 46 | — | — | 40 | 60 | — | — | — | 96 | 296 | 296 | 295 | 296 | 296 | 284 | 257 |
| | 47 | 40 | — | — | 30 | — | — | 30 | 93 | 286 | 286 | 285 | 285 | 284 | 265 | 235 |
| | 48 | — | 80 | 10 | 10 | — | — | — | 94 | 293 | 293 | 293 | 292 | 293 | 276 | 256 |
| | 49 | — | 20 | — | — | 60 | 20 | — | 95 | 303 | 303 | 302 | 302 | 303 | 294 | 268 |
| | 50 | 30 | — | 20 | 30 | 20 | — | — | 96 | 297 | 299 | 298 | 299 | 298 | 293 | 266 |
| | 51 | — | 20 | 20 | 30 | 30 | — | — | 95 | 291 | 290 | 290 | 291 | 290 | 287 | 260 |
| | 52 | 10 | — | 10 | 10 | 20 | — | 50 | 94 | 290 | 290 | 290 | 289 | 288 | 280 | 252 |
| | 53 | 20 | 10 | 20 | — | 10 | 30 | — | 95 | 301 | 302 | 301 | 302 | 300 | 298 | 271 |

From the results shown in Table 11, it can be seen that the composite soft magnetic sintered materials of the present invention 44 to 53, that were made by mixing the composite soft magnetic powders consisting of the soft magnetic metal powders of which particles are coated with ferrite layer of a different composition having a spinel structure and sintering the mixed powder, have higher density than the composite soft magnetic sintered materials of the prior art 1 to 7 shown in Table 7 and excellent relative magnetic permeability at high frequencies.

EXAMPLE 6

Two or more kinds of the composite soft magnetic powders AS to GS shown in table 9 made in Example 4 were mixed and the mixture was further mixed with SiO₂ powder having a mean powder particle size of 50 nm in the proportions shown in Table 12. The mixtures were hot-pressed with a pressure of 2 tons/cm² at 800° C. so as to make composite soft magnetic sintered materials of the present invention 54 to 59 having a ring shape measuring 35 mm in outer diameter, 25 mm in inner diameter and 5 mm in height. The relative density was measured on the composite soft magnetic sintered materials of the present invention 54 to 59, with the results shown in Table 12. The relative magnetic permeability at high frequencies was measured with an impedance analyzer at the frequencies shown in Table 12 on the composite soft magnetic sintered materials of the present invention 54 to 59, with the results shown in Table 12.

which particles were coated with ferrite layer having a spinel structure of a different composition with SiO₂ powder in the proportions shown in Table 12 and sintering the mixed powder, have a higher density than the composite soft magnetic sintered material of the prior art 1 to 7 shown in Table 7 that were made in Example 2 and excellent relative magnetic permeability at high frequencies.

EXAMPLE 7

The soft magnetic metal powders having the compositions shown in Table 13 were charged into a rolling agitation granulating apparatus to which 200 ml of polyvinyl alcohol solution 3% in concentration and ferrite powder in a proportion of 2% by weight to the soft magnetic metal powder were added so as to mix for 30 minutes while running the apparatus at a speed of 1000 rpm, thereby making composite soft magnetic powders AB, BB, CB, DB, EB, FB and GB shown in Table 13 by a binder coating process.

A SiO₂ powder having a mean powder particle size of 50 nm was mixed with the composite soft magnetic powders AB, BB, CB, DB, EB, FB and GB obtained as described above in the proportions shown in Table 14, with the mixed powder being subjected to high-pressure molding with a pressure of 10 tons/cm2 so as to mold ring-shaped green compacts measuring 35 mm in outer diameter, 25 mm in inner diameter and 5 mm in height. The ring-shaped green compacts were sintered at a temperature from 500 to 1200° C., thereby making the composite soft magnetic sintered

TABLE 12

| Composite soft magnetic sintered materials | | Proportion (% by weight) | | | | | | | | Relative density (%) | Relative magnetic permeability at various frequencies | | | | | | |
|---|---|---|---|---|---|---|---|---|---|---|---|---|---|---|---|---|---|
| | | Composite soft magnetic powder shown in Table 9 | | | | | | | SiO₂ powder | | 1 KHz | 3 KHz | 10 KHz | 30 KHz | 100 KHz | 300 KHz | 1 MHz |
| | | AS | BS | CS | DS | ES | FS | GS | | | | | | | | | |
| Composite soft magnetic sintered materials of present invention | 54 | — | 40 | — | — | 20 | 39.6 | — | 0.4 | 96 | 302 | 303 | 303 | 303 | 303 | 292 | 250 |
| | 55 | 29.1 | — | — | 20 | 20 | — | 30 | 0.9 | 97 | 307 | 307 | 308 | 308 | 307 | 304 | 293 |
| | 56 | 10 | 10 | 20 | — | — | 30 | 29.1 | 0.1 | 96 | 299 | 299 | 300 | 300 | 299 | 270 | 238 |
| | 57 | 40 | — | — | 20 | — | 39.4 | — | 0.6 | 97 | 305 | 305 | 304 | 304 | 303 | 300 | 282 |
| | 58 | — | 59.5 | — | — | — | 40 | — | 0.5 | 98 | 309 | 310 | 310 | 309 | 309 | 305 | 288 |
| | 59 | — | — | 39.3 | — | 20 | — | 40 | 0.7 | 97 | 300 | 301 | 300 | 299 | 299 | 298 | 280 |

Figure 2:
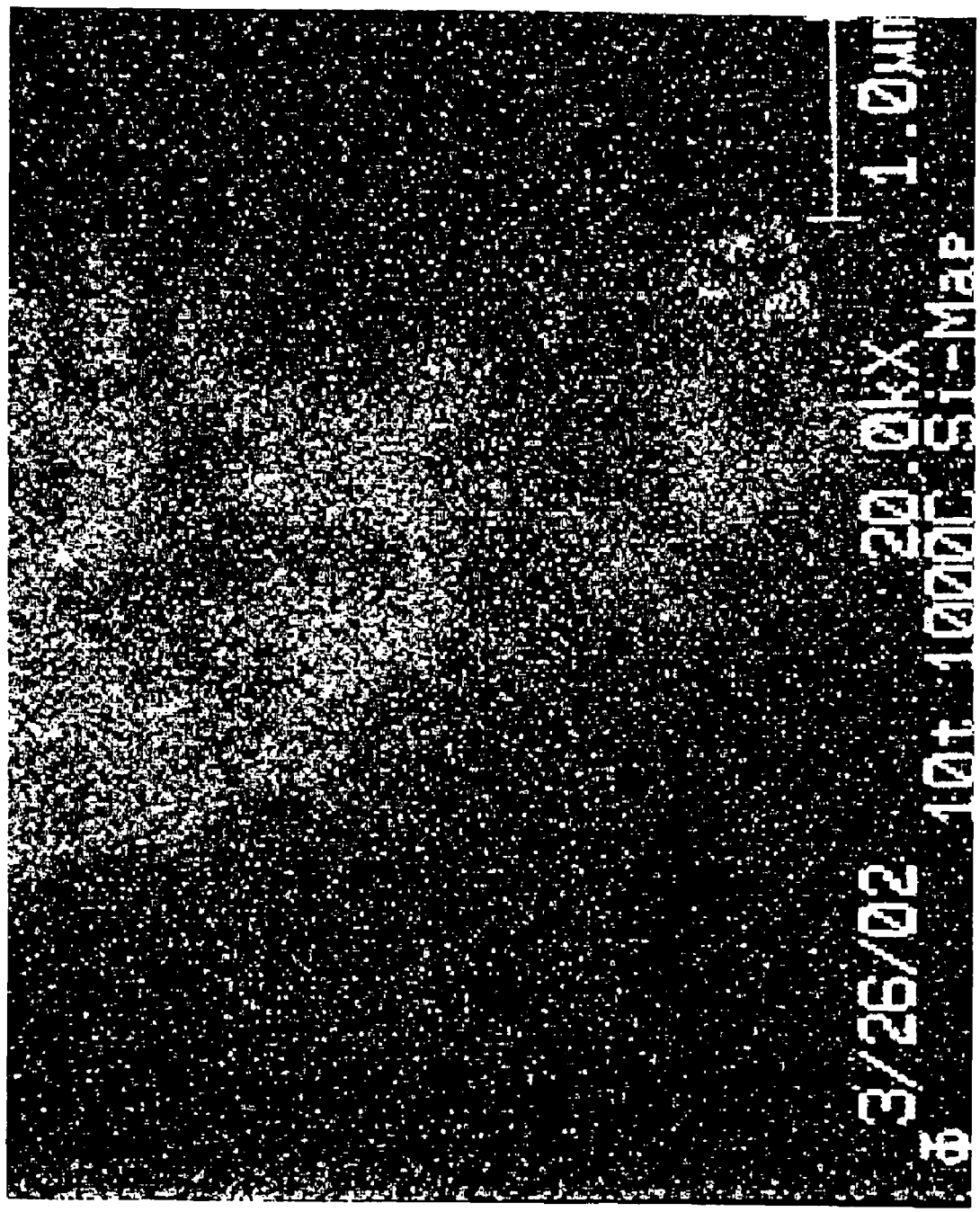
FIG. 2 is a photograph of an Auger electron image of Si showing the distribution of $SiO_2$ in the grain boundaries shown in FIG. 1.

It can be seen that the composite soft magnetic sintered materials of the present invention 54 to 59 shown in Table 12, that were made by mixing the composite soft magnetic powders consisting of the soft magnetic metal powder of materials of the present invention 60 to 66 having a ring shape. Auger electron spectrometer (AES) observation of the structures of the ring-shaped sintered bodies thus obtained showed 5i02 powder dispersed in the ferrite phase in all the composite soft magnetic sintered materials of the present invention 60 to 66. Results of analysis of the $SiO_2$ included in the grain boundary of the composite soft magnetic sintered material 61, in particular, with a surface analysis apparatus (Auger electron analyzer (AES), product name Physical Electronics 670xi produced by Perkin Elmer) are shown in FIGS. 1 and 2. FIG. 1 is a secondary electron image of the grain boundary and FIG. 2 is Auger electron image of Si in the grain boundary, which shows the distribution of $SiO_2$. From FIGS. 1 and 2, it can be seen that $SiO_2$ is dispersed substantially uniformly in the ferrite phase in the grain boundary. The relative density was measured on the composite soft magnetic sintered materials of the present invention 60 to 66, with the results shown in Table 14. The relative magnetic permeability at high frequencies was measured with an impedance analyzer at the frequencies shown in Table 14 on the composite soft magnetic sintered materials of the present invention 60 to 66, with the results shown in Table 14.

particles were coated with ferrite layer having a spinel structure by a binder coating method and hot pressing the mixed powder, have a higher density than the composite soft magnetic sintered material of the prior art 1 to 7 shown in Table 7 and excellent relative magnetic permeability at high frequencies.

EXAMPLE 8

The composite soft magnetic powders AB, BB, CB, DB, EB, FB and GB shown in Table 13 made in Example 7 were mixed in proportions shown in Table 15. The mixed powders were subjected to high-pressure molding with a pressure of 10 tons/cm$^2$ so as to make composite soft magnetic sintered materials of the present invention 67 to 76 having a ring shape measuring 35 mm in outer diameter, 25 mm in inner diameter and 5 mm in height. The relative density was measured on the composite soft magnetic sintered materials

TABLE 13

| Type | | Soft magnetic metal powder | | Ferrite coating layer | |
| --- | --- | --- | --- | --- | --- |
| | | Composition (% by weight) | Mean powder particle size (μm) | Composition (atomic %) | Mean thickness (μm) |
| Composite soft magnetic sintered materials | AB | Fe: 100 | 52 | $(Mn_{33}Fe_{67})_3O_4$ | 2.1 |
| | BB | Fe: 100 | 78 | $(Mn_{17}Zn_{16}Fe_{67})_3O_4$ | 2.8 |
| | CB | Fe: 99, Si: 1 | 69 | $(Cu_3Mg_3Zn_{23}Fe_{67})_3O_4$ | 1.4 |
| | DB | Fe: 97, Si: 3 | 90 | $(Mn_{10}Mg_5Zn_{14}Fe_{71})_3O_4$ | 2.0 |
| | EB | Fe: 90, Al: 10 | 76 | $(Mn_{10}Cu_5Zn_{18}Fe_{67})_3O_4$ | 2.9 |
| | FB | Fe: 21, Ni: 79 | 66 | $(Mn_{10}Cu_5Zn_{15}Fe_{70})_3O_4$ | 2.8 |
| | GB | Fe: 87, Cr: 13 | 61 | $(Mn_{25}Fe_{75})_3O_4$ | 1.4 |

TABLE 14

| Composite soft magnetic sintered materials | | Proportion (% by weight) | | Relative density (%) | Relative magnetic permeability at various frequencies | | | | | | |
| --- | --- | --- | --- | --- | --- | --- | --- | --- | --- | --- | --- |
| | | Composite soft magnetic powder shown in Table 13 | $SiO_2$ powder having mean powder particle size of 50 nm | | 1 KHz | 3 KHz | 10 KHz | 30 KHz | 100 KHz | 300 KHz | 1 MHz |
| Composite soft magnetic sintered materials of present invention | 60 | AB: 99.6 | 0.4 | 93 | 309 | 310 | 310 | 309 | 309 | 287 | 223 |
| | 61 | BB: 99.1 | 0.9 | 92 | 276 | 276 | 275 | 276 | 276 | 273 | 210 |
| | 62 | CB: 99.9 | 0.1 | 94 | 305 | 306 | 305 | 306 | 304 | 300 | 218 |
| | 63 | DB: 99.4 | 0.6 | 92 | 290 | 290 | 289 | 288 | 288 | 279 | 213 |
| | 64 | EB: 99.5 | 0.5 | 92 | 289 | 290 | 291 | 290 | 289 | 277 | 208 |
| | 65 | FB: 99.3 | 0.7 | 91 | 275 | 274 | 275 | 274 | 273 | 255 | 212 |
| | 66 | GB: 99.7 | 0.3 | 93 | 301 | 301 | 300 | 300 | 300 | 280 | 211 |

From the results shown in Tables 13 and 14, it can be seen that the composite soft magnetic sintered materials of the present invention 60 to 66, that were made by mixing 0.05 to 1.0% by weight of $SiO_2$ powder with the composite soft magnetic powders AB, BB, CB, DB, EB, FB and GB consisting of the soft magnetic metal powders of which of the present invention 67 to 76, with the results shown in Table 15. The relative magnetic permeability at high frequencies was measured with an impedance analyzer at frequencies shown in Table 15 on the composite soft magnetic sintered materials of the present invention 67 to 76, with the results shown in Table 15.

TABLE 15

| Composite soft magnetic sintered materials | | Proportion of composite soft magnetic powder shown in Table 13 (% by weight) | | | | | | | Relative density (%) | Relative magnetic permeability at various frequencies | | | | | | |
| --- | --- | --- | --- | --- | --- | --- | --- | --- | --- | --- | --- | --- | --- | --- | --- | --- |
| | | AB | BB | CB | DB | EB | FB | GB | | 1 KHz | 3 KHz | 10 KHz | 30 KHz | 100 KHz | 300 KHz | 1 MHz |
| Composite soft magnetic sintered | 67 | 50 | — | 50 | — | — | — | — | 95 | 293 | 294 | 293 | 294 | 293 | 285 | 261 |
| | 68 | — | 70 | — | — | 30 | — | — | 95 | 290 | 290 | 291 | 290 | 290 | 278 | 262 |

TABLE 15-continued

| Composite soft magnetic sintered materials | | Proportion of composite soft magnetic powder shown in Table 13 (% by weight) | | | | | | | Relative density (%) | Relative magnetic permeability at various frequencies | | | | | | |
|---|---|---|---|---|---|---|---|---|---|---|---|---|---|---|---|---|
| | | AB | BB | CB | DB | EB | FB | GB | | 1 KHz | 3 KHz | 10 KHz | 30 KHz | 100 KHz | 300 KHz | 1 MHz |
| materials of present invention | 69 | — | — | 40 | 60 | — | — | — | 96 | 295 | 295 | 294 | 295 | 294 | 284 | 260 |
| | 70 | 40 | — | — | 30 | — | — | 30 | 94 | 281 | 282 | 282 | 281 | 280 | 261 | 240 |
| | 71 | — | 80 | 10 | 10 | — | — | — | 94 | 290 | 290 | 289 | 289 | 287 | 276 | 257 |
| | 72 | — | 20 | — | — | 60 | 20 | — | 95 | 300 | 301 | 301 | 300 | 299 | 295 | 268 |
| | 73 | 30 | — | 20 | 30 | 20 | — | — | 95 | 291 | 290 | 290 | 290 | 290 | 292 | 257 |
| | 74 | — | 20 | 20 | 30 | 30 | — | — | 94 | 286 | 285 | 286 | 285 | 285 | 280 | 255 |
| | 75 | 10 | — | 10 | 10 | 20 | — | 50 | 94 | 288 | 288 | 289 | 288 | 287 | 275 | 254 |
| | 76 | 20 | 10 | 20 | — | 10 | 30 | — | 96 | 300 | 302 | 301 | 300 | 301 | 297 | 270 |

From the results shown in Tables 15, it can be seen that the composite soft magnetic sintered materials of the present invention 67 to 76, that were made by mixing the composite soft magnetic powders consisting of the soft magnetic metal powders of which particles were coated with layers of ferrite having a spinel structure of a different composition and sintering the mixed powder, have higher density than the composite soft magnetic sintered material of the prior art 1 to 7 shown in Table 7, and excellent relative magnetic permeability at high frequencies.

EXAMPLE 9

Two or more kinds of the composite soft magnetic powders AB to GB shown in Table 13 made in Example 7 were mixed and the mixture was further mixed with $SiO_2$ powder having a mean powder particle size of 50 nm in proportion shown in Table 16. The mixed powder was hot-pressed with a pressure of 2 tons/$cm^2$ at 800° C. so as to make composite soft magnetic sintered materials of the present invention 77 to 82 having a ring shape measuring 35 mm in outer diameter, 25 mm in inner diameter and 5 mm in height. The relative density was measured on the composite soft magnetic sintered materials of the present invention 77 to 82, with the results shown in Table 16. The relative magnetic permeability at high frequencies was measured with an impedance analyzer at frequencies shown in Table 16 on the composite soft magnetic sintered materials of the present invention 77 to 82, with the results shown in Table 16.

It can be seen that the composite soft magnetic sintered materials of the present invention 77 to 82, that were made by mixing the composite soft magnetic powders consisting of the soft magnetic metal powder of which particles were coated with ferrite layer having a spinel structure of a different composition with $SiO_2$ powder in proportion shown in Table 16 and sintering the mixed powder, have a higher density than the composite soft magnetic sintered material of the prior art 1 to 7 shown in Table 7 that were made in Example 2 and excellent relative magnetic permeability at high frequencies.

As will be understood from the foregoing detailed description, the present invention provides the composite soft magnetic sintered material having high industrial applicability, offering remarkable effects in the electrical and electronics industries.

The invention claimed is:

1. A composite soft magnetic sintered material having high density and high magnetic permeability, the sintered material comprising particles coated with a ferrite phase that has a spinel structure, wherein
    the particles are selected from the group consisting of iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles and nickel-based soft magnetic alloy particles;
    silicon dioxide particles having a mean powder particle size of 100 nm or less are dispersed in the ferrite phase; and,
    the content of silicon dioxide in the sintered material is from 0.05 to 1.0% by weight.

TABLE 16

| Composite soft magnetic sintered materials | | Proportion (% by weight) | | | | | | | | Relative density (%) | Relative magnetic permeability at various frequencies | | | | | | |
|---|---|---|---|---|---|---|---|---|---|---|---|---|---|---|---|---|
| | | Composite soft magnetic powder shown in Table 13 | | | | | | | $SiO_2$ powder | | 1 KHz | 3 KHz | 10 KHz | 30 KHz | 100 KHz | 300 KHz | 1 MHz |
| | | AB | BB | CB | DB | EB | FB | GB | | | | | | | | | |
| Composite soft magnetic sintered materials of present invention | 77 | — | 40 | — | — | 20 | 39.6 | — | 0.4 | 96 | 300 | 300 | 301 | 299 | 299 | 291 | 251 |
| | 78 | 29.1 | — | — | 20 | 20 | — | 30 | 0.9 | 97 | 304 | 304 | 303 | 304 | 304 | 300 | 290 |
| | 79 | 10 | 10 | 20 | — | — | 30 | 29.1 | 0.1 | 97 | 298 | 299 | 299 | 298 | 297 | 272 | 240 |
| | 80 | 40 | — | — | 20 | — | 39.4 | — | 0.6 | 96 | 301 | 301 | 300 | 300 | 300 | 291 | 273 |
| | 81 | — | 59.5 | — | — | — | 40 | — | 0.5 | 97 | 299 | 300 | 300 | 300 | 299 | 294 | 278 |
| | 82 | — | — | 39.3 | — | 20 | — | 40 | 0.7 | 96 | 297 | 297 | 297 | 296 | 295 | 290 | 270 |

2. A composite soft magnetic sintered material having high density and high magnetic permeability, the sintered material comprising a mixture of first coated particles and second coated particles, wherein the first coated particles comprise first magnetic particles coated with a first ferrite phase that has a spinel structure;

the second coated particles comprise second magnetic particles coated with a second ferrite phase that has a spinel structure;

the first ferrite phase and the second ferrite phase have different compositions; and the first magnetic particles and the second magnetic particles are independently selected from the group consisting of iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles and nickel-based soft magnetic alloy particles.

3. A composite soft magnetic sintered material having high density and high magnetic permeability, the sintered material comprising a mixture of first coated particles and second coated particles, wherein the first coated particles comprise first magnetic particles coated with a first ferrite phase that has a spinel structure;

the second coated particles comprise second magnetic particles coated with a second ferrite phase that has a spinel structure;

the first ferrite phase and the second ferrite phase have different compositions;

the first magnetic particles and the second magnetic particles are independently selected from the group consisting of iron particles, Fe—Si based soft magnetic iron alloy particles, Fe—Al based soft magnetic iron alloy particles, Fe—Si—Al based soft magnetic iron alloy particles, Fe—Cr based soft magnetic iron alloy particles and nickel-based soft magnetic alloy particles;

silicon dioxide particles having a mean powder particle size of 100 nm or less are dispersed among each of the first ferrite phase and the second ferrite phase; and the content of silicon dioxide in the sintered material is from 0.05 to 1.0% by weight.

4. A method of producing a composite soft magnetic sintered material having high density and high magnetic permeability, the method comprising mixing a composite soft magnetic powder, which is made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, with 0.05 to 1.0% by weight of silicon dioxide powder having a mean powder particle size in a range from 1 to 100 nm;

sintering the mixed powder after compression molding, high-pressure molding, warm compaction or cold isostatic pressing; and producing the sintered material of claim 1.

5. A method of producing a composite soft magnetic sintered material having high density and high magnetic permeability, the method comprising mixing a composite soft magnetic powder, which is made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, with 0.05 to 1.0% by weight of silicon dioxide powder having a mean powder particle size in a range from 1 to 100 nm;

subjecting the mixed powder to hot isostatic pressing or hot pressing; and producing the sintered material of claim 1.

6. A method of producing a composite soft magnetic sintered material having high density and high magnetic permeability, the method comprising preparing two or more kinds of composite soft magnetic powders, which are made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, where the ferrite layer has a different composition in each of the two or more kinds of composite soft magnetic powders;

mixing and sintering the two or more kinds of composite soft magnetic powders after compression molding, high-pressure molding, warm compaction or cold isostatic pressing; and producing the sintered material of claim 2.

7. A method of producing a composite soft magnetic sintered material having high density and high magnetic permeability, the method comprising preparing two or more kinds of composite soft magnetic powders, which are made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, where the ferrite layer has a different composition in each of the two or more kinds of composite soft magnetic powders;

mixing the two or more kinds of composite soft magnetic powders;

subjecting the mixed powders to hot isostatic pressing or hot pressing; and producing the sintered material of claim 2.

8. A method of producing a composite soft magnetic sintered material having high density and high magnetic permeability, the method comprising preparing two or more kinds of composite soft magnetic powders, which are made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, where the ferrite layer has a different composition in each of the two or more kinds of composite soft magnetic powder;

mixing two or more kinds of composite soft magnetic powders with 0.05 to 1.0% by weight of silicon dioxide powder having a mean powder particle size in a range from 1 to 100 nm sintering the mixed powders after compression molding, high-pressure molding, warm compaction or cold isostatic pressing; and producing the sintered material of claim 3.

9. A method of producing a composite soft magnetic sintered material having high density and high magnetic permeability, the method comprising preparing two or more kinds of composite soft magnetic powders, which are made by forming a ferrite layer that has a spinel structure on the surfaces of particles of iron powder, Fe—Si based soft magnetic iron alloy powder, Fe—Al based soft magnetic iron alloy powder, Fe—Si—Al based soft magnetic iron alloy powder, Fe—Cr based soft magnetic iron alloy powder or nickel-based soft magnetic alloy powder, where the ferrite layer has a different composition in each of the two or more kinds of composite soft magnetic powders;

mixing the two or more kinds of composite soft magnetic powders with 0.05 to 1.0% by weight of silicon dioxide powder having a mean powder particle size in a range from 1 to 100 nm and;

subjecting the mixed powders to hot isostatic pressing or hot pressing; and producing the sintered material of claim 3.

10. The method of claim 4, wherein the ferrite layer is formed by a chemical plating process, a high-speed impact agitation coating process or a binder coating process.

11. The method of claim 5, wherein the ferrite layer is formed by a chemical plating process, a high-speed impact agitation coating process or a binder coating process.

12. The method of claim 6, wherein the ferrite layer is formed by a chemical plating process, a high-speed impact agitation coating process or a binder coating process.

13. The method of claim 7, wherein the ferrite layer is formed by a chemical plating process, a high-speed impact agitation coating process or a binder coating process.

14. The method of claim 8, wherein the ferrite layer is formed by a chemical plating process, a high-speed impact agitation coating process or a binder coating process.

15. The method of claim 9, wherein the ferrite layer is formed by a chemical plating process, a high-speed impact agitation coating process or a binder coating process.

* * * * *